United States Patent

Beierl et al.

[11] Patent Number: 5,967,590
[45] Date of Patent: *Oct. 19, 1999

[54] DRIVING DEVICE FOR A MOTOR VEHICLE FOLDING TOP AND/OR A FOLDING TOP COMPARTMENT LID

[75] Inventors: Dominik Beierl, Korntal-Münchingen; Martin Luger, Weissach, both of Germany

[73] Assignee: Dr. Ing. H.C.F. Porsche AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/707,400

[22] Filed: Sep. 4, 1996

[30] Foreign Application Priority Data

Sep. 4, 1995 [DE] Germany .............. 195 32 568

[51] Int. Cl.⁶ ........................................... B60J 7/20
[52] U.S. Cl. .................. 296/107.01; 296/107.08; 296/117; 296/136
[58] Field of Search ................... 296/107, 106, 296/112, 113, 115, 117, 136, 107.08

[56] References Cited

U.S. PATENT DOCUMENTS

| | | | |
|---|---|---|---|
| 153,098 | 7/1874 | McKenzie | 296/112 |
| 320,332 | 6/1885 | Cannon et al. | 296/113 |
| 1,175,515 | 3/1916 | Freeman | 296/116 |
| 1,674,573 | 6/1928 | Salmons et al. | 296/117 |
| 2,230,140 | 1/1941 | Falcon | 296/117 |
| 2,682,780 | 7/1954 | Pickles | 296/117 |
| 2,716,256 | 8/1955 | Wise | 296/106 |
| 4,671,559 | 6/1987 | Kolb | 296/107 |
| 5,445,429 | 8/1995 | Koehler et al. | 296/107 |
| 5,533,777 | 7/1996 | Kleemann et al. | 296/136 X |
| 5,558,389 | 9/1996 | Rothe et al. | 296/107 |
| 5,758,923 | 6/1998 | Kolb | 296/107.09 |

FOREIGN PATENT DOCUMENTS

| | | | |
|---|---|---|---|
| 777528 | 2/1935 | France . | |
| 2698048 | 5/1994 | France | 296/107 |
| 41 30 133 | 5/1983 | Germany . | |
| 12440 | 9/1884 | United Kingdom | 296/113 |
| 1925 | 2/1885 | United Kingdom | 296/113 |
| 6264 | 4/1887 | United Kingdom | 296/113 |
| 253736 | 6/1926 | United Kingdom . | |

*Primary Examiner*—Dennis H. Pedder
*Attorney, Agent, or Firm*—Evenson, McKeown, Edwards & Lenahan, P.L.L.C.

[57] ABSTRACT

A driving device for a folding top and/or a folding top compartment lid of a motor vehicle comprises an adjusting linkage and a driving motor. For compensating relatively large tolerances and concept-caused compensating lifts, the adjusting linkage has an adjusting element which, on one end, has a tolerance compensating element. A spring-supported and length-compensating tension/compression element is arranged on the other end of the adjusting element.

6 Claims, 4 Drawing Sheets

5,967,590

DRIVING DEVICE FOR A MOTOR VEHICLE FOLDING TOP AND/OR A FOLDING TOP COMPARTMENT LID

This application is related to the application entitled FOLDING TOP FOR A PASSENGER VEHICLE filed on Aug. 29, 1996 in the name of Eugen KOLB based on Priority Document 195 32 567.2 filed in Germany on Sep. 4, 1995 now U.S. Pat. No. 5,758,923.

BACKGROUND AND SUMMARY OF THE INVENTION

The present invention relates to a driving device for a folding top and/or a folding top compartment lid, and more particularly to a driving device having an adjusting linkage and a driving motor.

During the mounting of the driving device for a motor vehicle folding top and/or a folding top compartment lid, large mounting and manufacturing tolerances must be compensated.

It is an object of the present invention to take such measures on an adjusting linkage for a motor vehicle folding top and/or a folding top compartment lid that, on one hand, to compensate relatively large tolerances and, on the other hand, to compensate concept-caused compensating lifts of the adjusting linkage.

According to the present invention, this object has been achieved by providing that the adjusting linkage comprises at least one adjusting element having a tolerance compensating element on one end thereof and, on another end thereof, a spring-supported and length-compensating tension/compression element.

Among the principal advantages achieved by the present invention are that, as the result of the arrangement of an adjusting element in the adjusting linkage which, on one end, has a tolerance compensating element and, on the other end, has a spring-supported and length-compensating tension/compression element, relatively high mounting and manufacturing tolerances as well as concept-caused compensating lifts can be compensated. The adjusting element also has a simple construction and a good operation.

The tolerance compensating element of the present invention, which consists essentially of a bush connected with the housing and a pin screwed into the bush, also has a simple construction. Mounting and manufacturing tolerances can be compensated rapidly and simply.

The tension/compression element provides that the folding top compartment lid is pulled downward into its closed position by a defined force, with the tension/compression element lengthening during this movement.

Other objects, advantages and novel features of the present invention will become apparent from the following detailed description of the invention when considered in conjunction with the accompanying drawings.

DETAILED DESCRIPTION OF THE DRAWINGS

Figure 1:
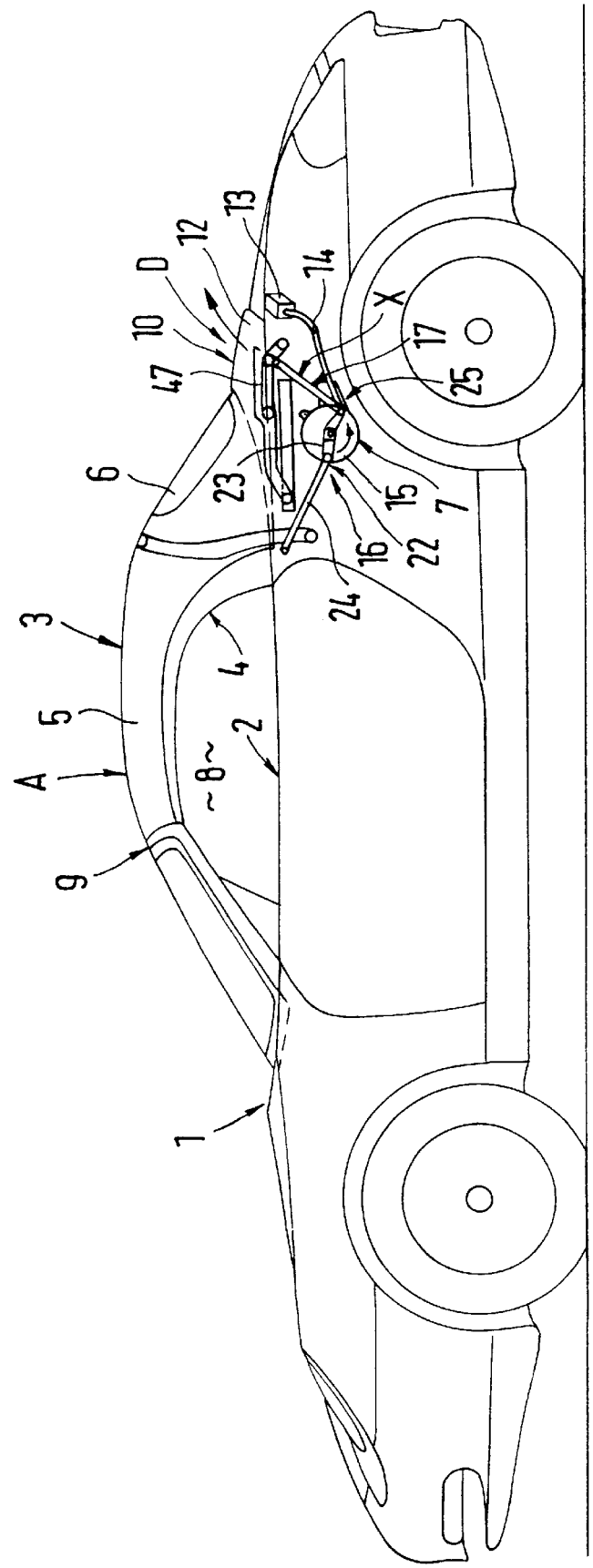
FIG. 1 is a side view of a passenger car with a folding top and a folding top compartment lid, each in the closed position, and of a driving device for the folding top and the folding top compartment lid.
Figure 2:
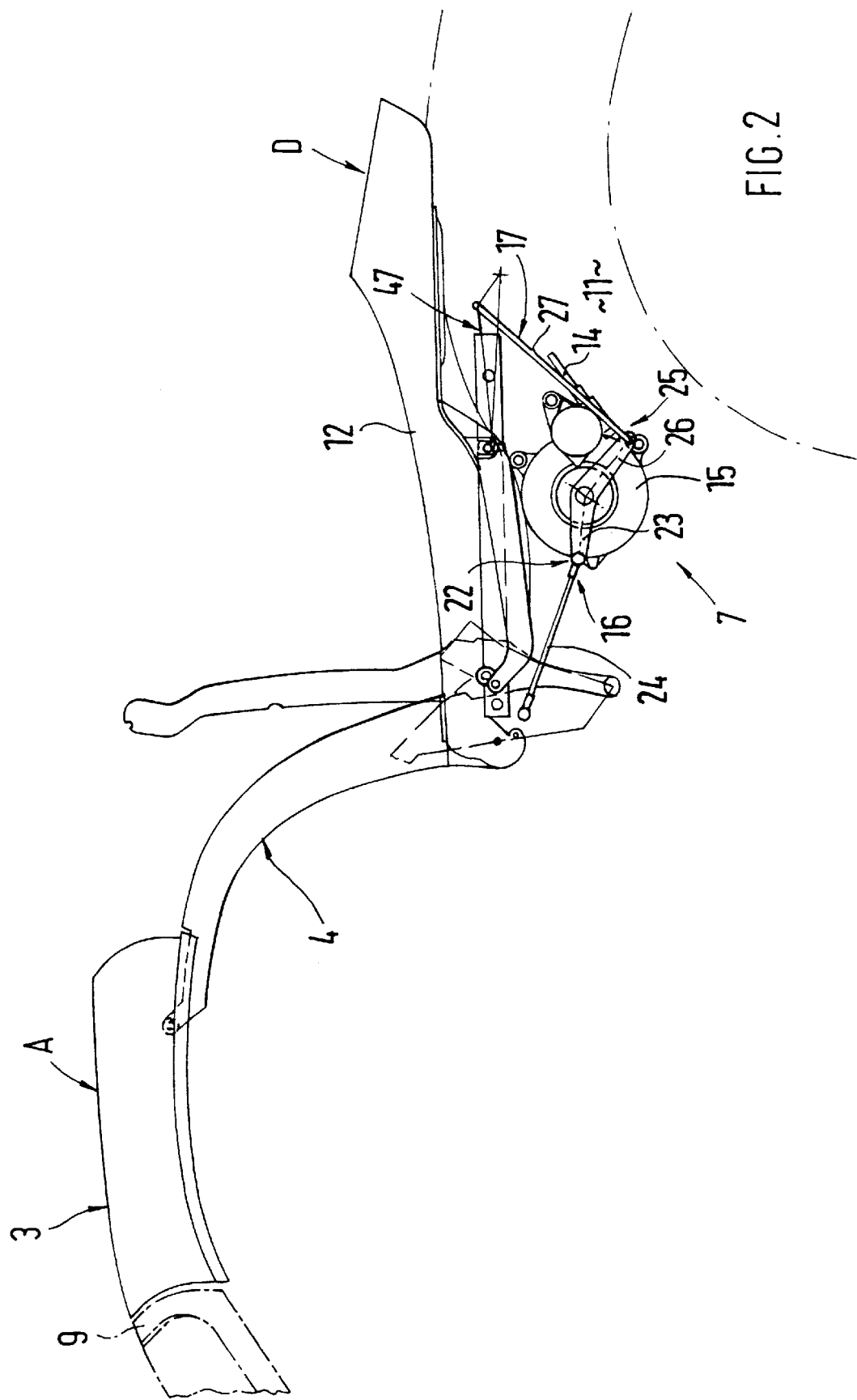
FIG. 2 is an enlarged, partial side view of the folding top in the closed position, of the driving device and of the folding top compartment lid in the closed position.
Figure 3:
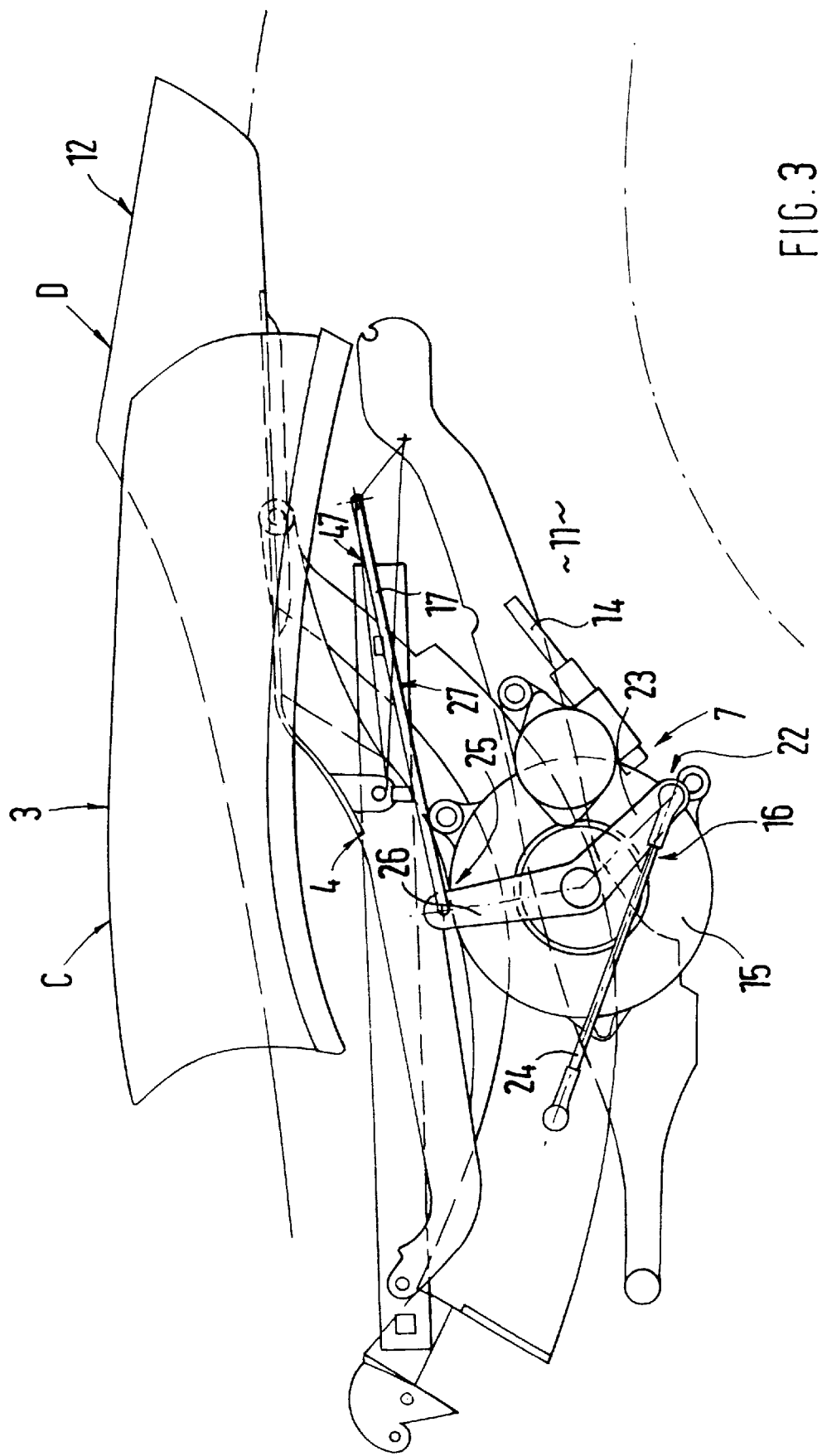
FIG. 3 is an enlarged, partial side lateral view of the folding top in the deposited condition and of the folding top compartment lid in the closed position.
Figure 4:
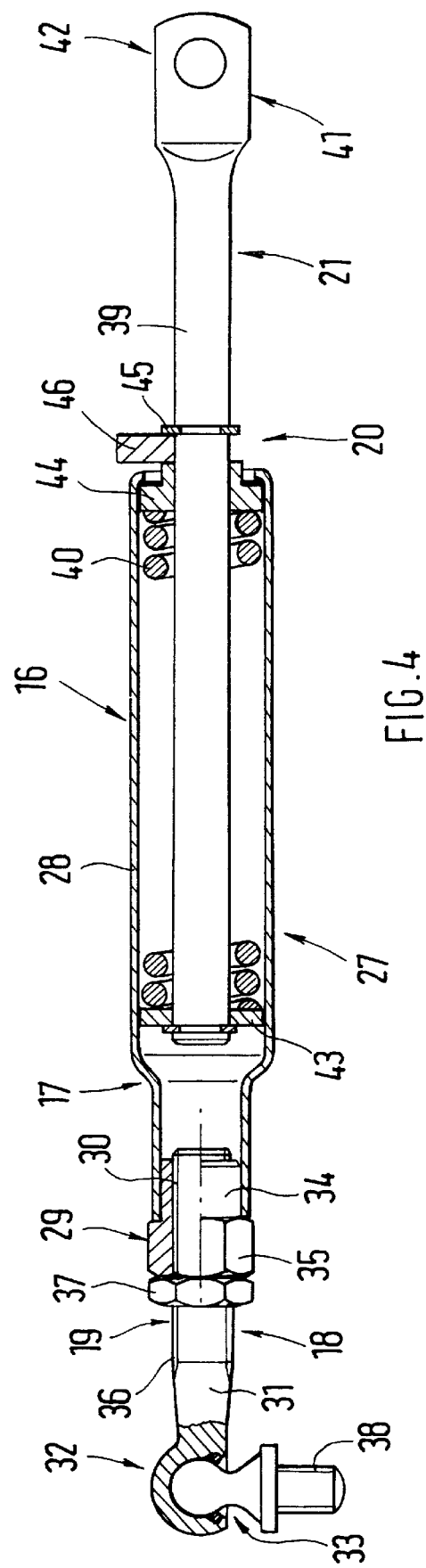
FIG. 4 is an enlarged isolated view of the detail X of FIG. 1.

FIG. 1 shows a passenger car 1 which is formed by a convertible and which has a folding top 3 above a belt line 2. The folding top 3 is formed by a folding or convertible top which is composed of a folding top structure 4 which is swivellably connected to the vehicle body and of a folding top covering 5 which is held in position there. In the rearward area of the folding top covering 5, a viewing pane 6 is formed by a flexible or rigid rear pane.

By way of a driving device 7, the folding top 3 can be displaced from a closed position A spanning the passenger compartment 8 by way of intermediate positions toward the rear into a rear-side deposited position C, the opening and closing operation taking place automatically.

In the closed position A, the folding top 3 extends from a windshield frame 9 to a rear area 10 and is held in position on the windshield frame 9 by way of at least one releasable locking device of generally known construction and therefore not shown in detail.

In the deposited position C, the folded-together folding top 3 is accommodated in a rear-side receiving space which is formed, for example, by a folding top compartment 11. In the upward direction, the folding top compartment 11 is covered at least in areas by a folding top compartment lid 12 situated thereabove. The driving device 7 moves the folding top 3 between the closed position A and the deposited position C, and the folding top compartment lid 12 can be moved between a closed position D and an open position.

The driving device 7 for the folding top 3 and/or the folding top compartment lid 12 comprises an electric driving motor 13 which, by way of bendable shafts 14, is in an operative connection with laterally exterior gearing units 15 mounted on the body side. An adjusting linkage 16 connects each gearing unit 15 with the folding top 3 and/or the folding top compartment lid 12.

In order, on one hand, to compensate relatively large mounting and manufacturing tolerances and, on the other hand, concept-caused compensating lifts of the adjusting linkage 16, the present invention provides that the adjusting linkage 16 comprises at least one adjusting element 17 which, on its one end 18, has a tolerance compensating element 19 and, on the other end 20, is provided with a spring-supporting and length-compensating tension/compression element 21.

Each adjusting linkage 16 comprises a first crank mechanism 22 which is in an operative connection with the folding top structure 4 and the gearing unit 15 and is composed of a first crank arm 23 and of a first connecting rod 24. In addition, each adjusting linkage 16 has a second crank mechanism 25 which is connected to the first crank mechanism 22 and to the folding top compartment lid 12. The second crank mechanism 25 consists of the second crank arm 26 and the second connecting rod 27.

The adjusting element 17 forms the second connecting rod 27. It is also within the scope of the present invention that the adjusting element 17 forms the first connecting rod 24 or another control arm of the adjusting linkage 16. The adjusting element 17 comprises a cylindrical housing 28 in which the tolerance compensating element 19 and the tension/compression element 21 are accommodated at least in sections. The tolerance compensating element 19 comprises a bush 29 which is provided with a continuous internal thread 30, with a pin 31 being screwed into the bush 29 and having a ball-and-socket joint arrangement 33 on its free end 32.

By way of a cylindrical section 34, the bush 29 projects into the housing 28 and is preferably fixedly connected with the housing 28 by pressing or the like. A projecting area of the bush 29 is constructed on its exterior side as a multi-cornered structure 35 forming a nut. In front of the multi-cornered structure 35, a lock nut 37 is screwed onto the external thread 36 of the pin 31 and forms an operative connection with the multi-cornered structure 35.

According to the tolerance position, the pin 31 is screwed into the internal thread 30 to different extents and is fixed in the correct position by the bracing of the lock nut 37 with the multi-cornered structure 35. Thus, in a simple manner, relatively large mounting and manufacturing tolerances can be compensated. An end-side threaded pin 38 of the ball-and-socket arrangement 33 is connected with the second crank arm 26 of the adjusting linkage 16.

The tension/compression element 21 projects by way of a partial area of its longitudinal dimension, into the housing 28 and is composed essentially of a rod 39 and a pressure spring 40. The rod 39 has a cylindrical cross-section and is provided on its projecting free end 41 with a flattened fastening eye 42. The pressure spring 40, which extends inside the housing 28, surrounds the rod 39 in a coaxial manner and is supported on one side on a locking washer 43 fixedly connected with the rod 39 and, on the other side, with a housing-side abutment 44.

The prestressed pressure spring 40 moves the tension/compression element 21 in the direction of the tolerance compensating element 19. This movement is bounded by a stop 45 mounted outside the housing 28 on the tension/compression element. For achieving a defined prestressing of the pressure spring 40, a mounting disk 46 is inserted between the exterior side of the abutment 44 and the stop 45, which mounting disk 46 falls out automatically during the tensioning of the pressure spring 40 when the defined prestress is reached. The defined prestressing of the pressure spring 40 provides that the folding top compartment lid 12 is pulled downward into its closed position D by a defined force.

When the folding top compartment lid 12 is pulled shut, the adjusting element 17 is lengthened by a certain path. The adjusting element 17 is connected in an articulated manner, on the one side, with the second crank arm 27 of the adjusting linkage 16 and, on the other side, with a steering lever 47 of the adjusting linkage 16 applied to the folding top compartment lid 12. The adjusting element 17 can, however, also be in an operative connection with the folding top linkage 4 of the folding top 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Driving device for at least one of a folding top and a folding top compartment lid of a convertible vehicle, comprising an adjusting linkage and a driving motor operatively associated with the adjusting linkage, wherein the adjusting linkage comprises at least one adjusting element having on one end thereof a relatively movable spring-supported and length-compensating tension/compression element which provides a defined prestress so that the at least one of the folding top and the folding top compartment lid is caused to be pulled downwardly into a closed position with a defined force upon actuation of the driving motor and wherein the tension/compression element projects, by way of a partial area of a longitudinal dimension thereof, into a housing, and a pressure spring, coaxially surrounds the tension/compression element and is supported, on one side, on a locking washer fixedly connected with the tension/compression element and, on another side, on a housing-side abutment.

2. The driving device according to claim 1, wherein the adjusting element comprises a cylindrical housing in which the tension/compression element is operatively accommodated.

3. The driving device according to claim 1, wherein movement of the pressure spring is bounded by a stop mounted outside the housing on the tension/compression element.

4. Driving device according to claim 3, wherein, for a defined prestressing of the pressure spring, a mounting disk is inserted between the exterior side of the abutment and the stop, which mounting disk is arranged to fall out automatically during tensioning of the pressure spring when defined prestress is reached.

5. The driving device according to claim 1, wherein the adjusting element is connected in an articulated manner, on one side thereof, with a crank arm of the adjusting linkage and, on another side thereof, with a steering lever of the adjusting linkage applied to the folding top compartment lid.

6. The driving according to claim 1, wherein the adjusting element is operatively connected with the folding top linkage of the folding top.

* * * * *